(12) United States Patent
Terasawa

(10) Patent No.: US 6,456,606 B1
(45) Date of Patent: Sep. 24, 2002

(54) HANDOFF CONTROL IN AN ASYNCHRONOUS CDMA SYSTEM

(75) Inventor: Daisuke Terasawa, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/275,524

(22) Filed: Mar. 24, 1999

(51) Int. Cl.[7] .............................................. H04B 7/216
(52) U.S. Cl. ...................... 370/331; 370/335; 455/436
(58) Field of Search .................. 370/331, 335; 455/436, 442, 502, 522

(56) References Cited

U.S. PATENT DOCUMENTS

| | | | |
|---|---|---|---|
| 5,652,748 A | | 7/1997 | Jolma et al. ............... 370/320 |
| 5,673,260 A | | 9/1997 | Umeda et al. .............. 370/342 |
| 5,850,607 A | * | 12/1998 | Muszynski .................. 455/442 |
| 5,872,774 A | * | 2/1999 | Wheatley, III et al. ...... 370/335 |
| 5,884,187 A | * | 3/1999 | Ziv et al. ..................... 455/522 |
| 5,949,773 A | * | 9/1999 | Bhalla et al. ............... 370/331 |
| 6,018,667 A | * | 1/2000 | Ghosh et al. ............... 455/502 |
| 6,101,175 A | * | 8/2000 | Schorman et al. .......... 370/331 |

FOREIGN PATENT DOCUMENTS

| | | |
|---|---|---|
| EP | 0779755 | 6/1997 |
| EP | 0794682 | 9/1997 |
| EP | 0810742 | 12/1997 |
| EP | 0812122 | 12/1997 |
| EP | 0981255 | 2/2000 |
| EP | 1011211 | 6/2000 |
| WO | 9508899 | 3/1995 |
| WO | 9532594 | 11/1995 |
| WO | 9916261 | 4/1999 |

* cited by examiner

Primary Examiner—Hassan Kizou
(74) Attorney, Agent, or Firm—Philip R. Wadsworth; Kent D. Baker; Sean English

(57) ABSTRACT

In a CDMA system in which the base stations are not each time aligned with one another, the handoff process accommodates the handoff by allowing for frame alignment. For example, frame alignment may be accomplished through the use of a selected set or may be remote unit aligned without reference to external sources. In addition, the neighbor list may included additional entries.

8 Claims, 6 Drawing Sheets

HANDOFF CONTROL IN AN ASYNCHRONOUS CDMA SYSTEM

BACKGROUND OF THE INVENTION

I. Field of the Invention

The invention relates generally to wireless communications. More particularly, the invention relates to handoff control in a wireless communication system.

II. Description of the Relaxed Art

FIG. 1 is an exemplifying embodiment of a terrestrial wireless communication system 10. FIG. 1 shows the three remote units 12A, 12B and 12C and two base stations 14. In reality, typical wireless communication systems may have many more remote units and base stations. In FIG. 1, the remote unit 12A is shown as a mobile telephone unit installed in a car. FIG. 1 also shows a portable computer remote unit 12B and the fixed location remote unit 12C such as might be found in a wireless local loop or meter reading system. In the most general embodiment, remote units may be any type of communication units. For example, the remote units can be hand-held personal communication system units, portable data units such as a personal data assistant, or fixed location data units such as meter reading equipment. FIG. 1 shows a forward link signal 18 from the base stations 14 to the remote units 12 and a reverse link signal 20 from the remote units 12 to the base stations 14.

An industry standard for a wireless system using code division multiple access (CDMA) is set forth in the TAU/EIA Interim Standard entitled "Mobile Station—Base Station Compatibility Standard for Dual-Mode Wideband Spread Spectrum Cellular System", TIA/ELA/IS-95, and its progeny (collectively referred to herein as IS-95), the contents of which are also incorporated herein by reference. More information concerning a code division multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated in its entirety herein by this reference.

In an IS-95 system, each base station synchronizes its operation with other base stations in the system. For example, in one embodiment, the IS-95 base stations synchronize operation to a universal time reference such as Global Positioning Satellites (GPS) signaling. Based upon the synchronizing time reference, each base station in a given geographical area is assigned a sequence offset of a common pseudo noise (PN) pilot sequence. For example, according to IS-95, a PN sequence having $2^{15}$ chips and repeating every 26.66 milliseconds (ms) is transmitted by each base station in the system at one of $5^{12}$ PN sequence offsets as a pilot signal. According to IS-95 operation, the base stations continually transmit the pilot signal which can be used by the remote units to identify the base stations as well as for other functions.

Various methods exist for transferring communication with the remote unit from one base station to another through a process known as handoff. Handoff may be necessary if a remote unit operating in the coverage area of an original base station moves into the coverage area of a target base station. One method of handoff used in CDMA systems is termed a "soft" handoff. Through the use of soft handoff, communication with the target base station is established before termination of communication with the original base station. When the remote unit is communicating with two base stations, both the remote unit and base stations create a single signal from the multiple received signals. Through the use of soft handoff, communication between the remote unit and the end user is uninterrupted by the eventual handoff from the original base station to the target base station. U.S. Pat. No. 5,267,261 entitled "MOBILE STATION ASSISTED SOFT HANDOFF IN A CDMA CELLULAR COMMUNICATIONS SYSTEM," which is assigned to the assignee of the present invention and which is incorporated herein, discloses a method and system for providing communication with the remote unit through more than one base station during the handoff process. Further information concerning handoff is disclosed in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", U.S. Pat. No. 5,640,414, entitled "MOBILE STATION ASSISTED SOFT HANDOFF IN A CDMA CELLULAR COMMUNICATIONS SYSTEM", and U.S. Pat. No. 5,625,876 entitled "METHOD AND APPARATUS FOR PERFORMING HANDOFF BETWEEN SECTORS OF A COMMON BASE STATION," each of which is assigned to the assignee of the present invention and incorporated in its entirety herein by this reference. The subject matter of U.S. Pat. No. 5,625,876 concerns so-called "softer handoff." For the purposes of this document, the term "soft handoff" is intended to include both "soft handoff" and "softer handoff."

As described in the above mentioned patents, remote unit assisted soft handoff operates based on the pilot signal strength of several sets of base stations as measured by the remote unit: the active set, the neighbor set, the candidate set and remaining set. The active set is the set of base stations through which active communication is established. The neighbor set is a set of base stations surrounding the active base stations and comprising base stations that have a high probability of having a pilot signal strength of sufficient level to establish communication. The candidate set is a set of base stations having a pilot signal strength of sufficient level to establish communication but through which active communication is not yet established. The remaining set is a set of base stations which are not in any of the other three sets.

The remote unit uses these sets to control the handoff process. In this example, we shall assume that when communications are initially established, a remote unit communicates through a first base station, and the active set contains only the first base station; although in many cases, the active set contains more than one base station before the handoff process is begun with respect to yet another base station. The remote unit monitors the pilot signal strength of the base stations in the active set, the candidate set, the neighbor set and the remaining set. When a pilot signal strength of a base station in the neighbor or remaining set exceeds a predetermined threshold level, the base station is added to the candidate set and removed from the neighbor or remaining set at the remote unit. The remote unit communicates a pilot strength measurement overhead message through the first base station identifying the new base station. A system controller receives the pilot strength measurement overhead message from the first base station and decides whether to establish communication between the new base station and the remote unit. Should the system controller decide to do so, the system controller sends a message to the new base station with identifying information about the remote unit and a command to establish communications with the remote unit.

A handoff message is also transmitted to the remote unit through the first base station. The handoff message is an overhead message which identifies a new active set that includes the first and the new base stations. The handoff message also identifies which channel has been allocated for use by the remote unit with the new base station. The remote unit searches for the new base station's transmitted signal, and communication is established with the new base station without termination of communication through the first base station. This process can continue with additional base stations such that two or more base stations are in the active set.

When the remote unit is communicating through multiple base stations, it continues to monitor the signal strength of the base stations of the active set, the candidate set, the neighbor set and the remaining set. Should the signal strength corresponding to a base station of the active set drop below a predetermined threshold for a predetermined period of time, the remote unit generates and transmits an overhead message to report the event. The system controller receives this message through at least one of the base stations with which the remote unit is communicating. In response to receiving this message, the system controller can decide to terminate communications through the base station having a weak signal strength.

Upon forming a decision to terminate communications through a base station, the system controller generates a handoff message identifying a new active set of base stations. The new active set does not contain the base station through which communication is to be terminated. The base stations through which communication is established send the handoff message to the remote unit with the new active set. The remote unit receives the overhead message and removes the base station from the active set and, typically, places it in the neighbor set. The remote unit communications are, thus, routed only through base stations identified in the new active set.

Because the remote unit is communicating with the end user through at least one base station at all times throughout the soft handoff process, no interruption in communications occurs between the remote unit and the end user. A soft handoff provides significant benefits in its inherent "make before break" communication over conventional "break before make" (hard handoff) techniques employed in cellular communication systems employing other multiple access techniques such as time division multiple access (TDMA) or frequency modulation (FM).

As noted above, each base station is associated with a set of neighboring base stations surrounding the base station. Due to the close physical proximity of the coverage areas of the neighboring base stations to the coverage area of the active base station, the remote units which are communicating with the active base station are more likely to handoff to one of the neighboring base stations than to other base stations in the system. The base station identifies the neighboring base stations to the remote units with which it has established communication using a neighbor list identification message. The neighbor list identification message identifies a neighboring base station according to the PN sequence offset at which it transmits the pilot signal.

Due to path delays and multipath, the relative time offset between two pilot signals arriving at a remote unit from neighboring base stations is typically not identically equal to the nominal PN sequence offset. In addition, the delay and the multipath environment is constantly changing due to the relative movement of objects within the base station coverage areas. Therefore, a searching element within the remote unit is used to search for the pilot signals of the neighboring base stations over a range of PN sequence offsets relative to known timing conditions.

Each search which the searching element performs can be characterized as having a nominal PN sequence offset and a corresponding search window. The search window specifies a set of PN sequence offsets around the nominal PN sequence offset. Generally, the search window comprises a range of offsets in which the remote unit is likely to detect a pilot signal. For each offset processed, the searching element finds the correlation energy at that offset by despreading the antenna samples using the same PN sequence used to generate the pilot signal. The searching element accumulates the energy for a period of time and reports the accumulated energy to a remote unit controller. If the accumulated energy exceeds a certain threshold, a pilot signal is detected.

The remote unit uses the neighbor list to limit the space over which it searches for handoff candidates. For example, because the searching process is so resource intensive, it is advantageous to avoid performing a search over the entire set of possible PN sequence offsets. By using the neighbor list, the remote unit can concentrate its resources on those PN sequence offsets which are most likely to correspond to useful signal paths.

The IS-95 operation is practical so long as each base station's timing remains synchronous with respect to the others. However, in some systems, advantages are achieved by decoupling operation of the system from a synchronizing reference. For example, in a system which is deployed underground, such as in a subway system, it can be difficult to derive a universal time synchronization signal using GPS. In addition, in certain political climates, it is perceived as desirable to decouple system operation from signaling under the control of another political entity.

In a system where one or more of the base stations operate asynchronously with respect to other base stations in the system, the base stations cannot be distinguished from one another based upon a relative time offset (typically measured as a relative PN sequence offset) because a relative time offset between the base stations cannot be established without the use of a universal time reference. Therefore, the handoff control systems just described must be modified to accommodate asynchronous operation.

Thus, there is a need in the art to develop a handoff control mechanism for use in an asynchronous CDMA system.

SUMMARY OF THE INVENTION

In one embodiment, in a system where a wireless remote unit is capable of communication with multiple base stations simultaneously, handoff to a subsequent base station is controlled through use of a selected set of base stations. For example, if frame synchronization between a second base station and the active base station is unknown, when a second base station has signal strength sufficient to establish communication, the remote unit transmits a message to a network controller identifying the second base station. The network controller determines an availability of resources at the second base station. If resources are available, the base station sends a message via the first base station identifying the second base station as a selected base station. In response, the remote unit monitors an overhead channel from the second base station in order to determine a frame synchronization of the second base station. The remote unit transmits the frame synchronization to the network controller. The network controller commands the second base station to begin transmission of signals to the remote unit such that the transmission from the second base station arrives at the remote unit approximately synchronized with the transmission from the first base station.

In another embodiment, time alignment in a wireless communications system is achieved by the remote unit without using the round trip messages of the selected set embodiment. For example, the remote unit receives a forward link transmission from a first base station having a first frame alignment. The remote unit receives a second forward link transmission from a second base station having a second frame alignment. The second frame alignment comprises information concerning frame boundaries but not information concerning an absolute frame number. The remote unit combines the first forward link transmission and the second forward link transmission according to a first frame alignment. The remote unit determines whether a performance indication is within expected limits. If the performance indication is not within the expected limits, the remote unit combines the first forward link transmission and the second forward link transmission using a second frame alignment.

In yet another embodiment, a composite neighbor list is created by the remote unit or the network controller for use during the handoff process. For example, in the case of the remote unit determined composite neighbor list, the remote unit receives one or more neighbor lists corresponding to one or more active base stations. The remote unit removes entries from the one or more neighbor lists corresponding to base stations through which active communication is established. The remote unit aligns a time offset reference of at least one entry in the neighbor lists so that the entries in the neighbor lists are referenced to a common timing reference. For each base station having more than one entry on the neighbor list, the remote unit determines a single composite entry specifying a composite search window equal to the intersection of a search window specified in each entry corresponding to the base station.

In yet a further embodiment, the neighbor list used to facilitate handoff comprises a series of entries. The entries comprise information identifying a reference base station and a PN offset. A timing of the reference base station is used as a reference timing for the PN offset. The entries may further comprise a window size over which a search should be performed. The window size may implicitly carry information concerning a relative class of synchronization between the reference base station and the base station to which the entries correspond. For example, the window size may carry information concerning whether the base station corresponding to the entry is frame synchronized with the reference base station.

BRIEF DESCRIPTION OF THE DRAWINGS

The features, objects and advantages of the present invention will become more apparent from the detailed description set forth below when taken in conjunction with the drawings in which like reference characters identify correspondingly throughout, and wherein.

DETAILED DESCRIPTION OF THE INVENTION

In an asynchronous code division multiple access (CDMA), no universal time reference is used to synchronize the operation of the base stations. In some cases, groups of base stations are synchronized to a single reference. For example, a set of base stations deployed within a single building can be synchronized to a common timing source. In addition, sectors within a base station are typically synchronized to a common source. However, the relative timing between other base stations in the system is unknown or less than purely synchronous.

Figure 1:
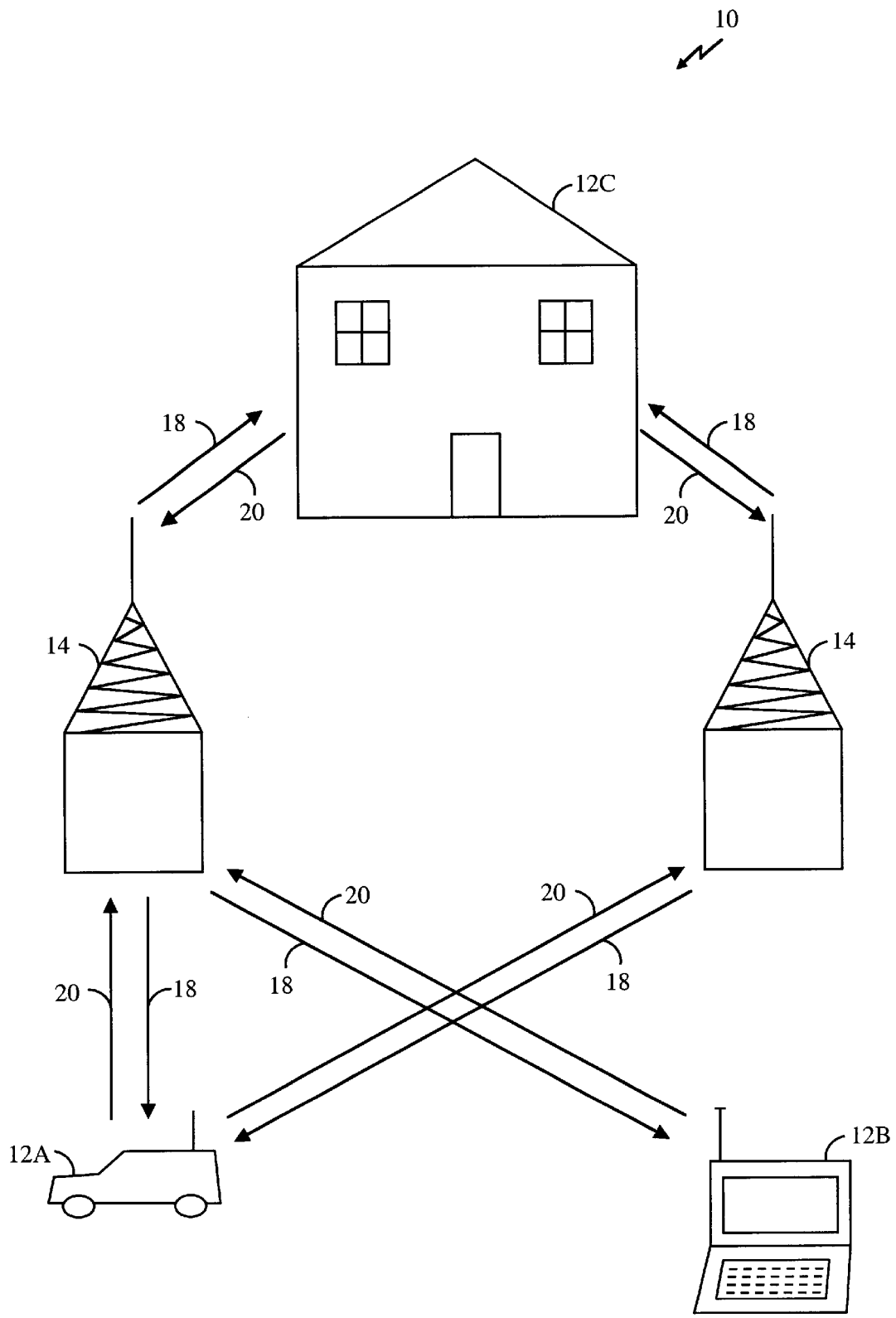
FIG. 1 is a block diagram showing a typical modern wireless communication system.
Figure 2:
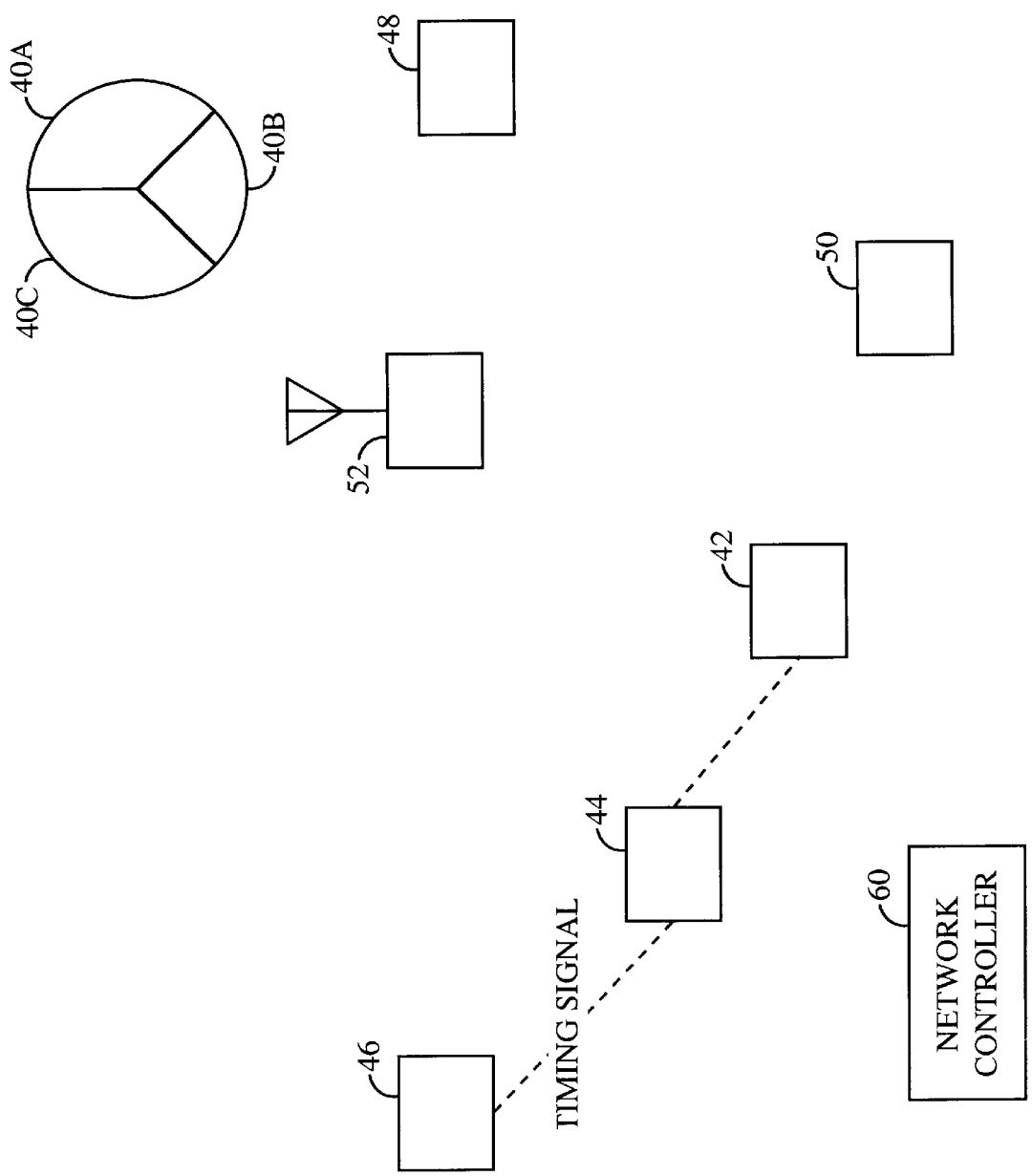
FIG. 2 is a block diagram showing a set of base stations in an asynchronous system.

FIG. 2 is a block diagram showing a set of base stations in an asynchronous system. FIG. 2 shows a multi-sectored base station having sectors labeled 40A, 40B and 40C. In this document, the term base station may be used to refer to a single sectored base station, a sector of a multisectored base station, or a multi-sectored base station. Using this terminology, in this case we shall assume that the base stations 40A–40C are sectors in a common multisectored base station and operate from a common time reference so as to be purely synchronous with respect to one another.

The system shown in FIG. 2 also comprises base stations 42, 44 and 46. The base stations 42, 44 and 46 are synchronized to some lesser extent than the base stations 40A–40C. The system also comprises base stations 48 and 50. The base stations 48 and 50 operate asynchronously with respect to one another as well as with respect to the base stations 40A–40C and the base stations 42–46. The base stations are controlled by a network controller 60. The base stations 42–50 are each assigned a geographically unique PN sequence with which to generate a pilot signal as well as other signals. One cycle of the PN sequence is referred to as a frame. A logical connection (not shown) couples each of the base stations 40–50 to the network controller 60. During soft handoff, the network controller 60 merges the signals received from the remote unit via the active base stations. Additional information concerning base station and network controller operation is disclosed in U.S. Pat. No. 5,654,979 entitled "CELL SITE DEMODULATION ARCHITECTURE FOR A SPREAD SPECTRUM MULTIPLE ACCESS COMMUNICATION SYSTEMS," and in U.S. Pat. No. 5,490,165 entitled "DEMODULATION ELEMENT ASSIGNMENT IN A SYSTEM CAPABLE OF RECEIVING MULTIPLE SIGNALS" each of which is assigned to the assignee of the present invention and incorporated in its entirety herein by this reference.

Another one of the tasks executed by the network controller 60 is the generation of a neighbor list for the remote units (such as a remote unit 52) operating in the system. One purpose of the neighbor list is to limit the search space over which a remote unit attempts to find pilot signals transmitted by the base stations. The neighbor list information can be transmitted to a remote unit from the network controller 60 via one or more base stations over a remote-unit-specific or broadcast channel.

As noted above, in an IS-95 system, each base station system is assigned a unique PN sequence offset of a common PN sequence. Thus, in an IS-95 system, the neighbor list identifies the neighboring base stations according to relative PN offset. However, in an asynchronous system, the relative time offsets of some base stations are unknown and, thus, the base stations cannot be identified by a relative PN offset.

For this reason, in the asynchronous system shown in FIG. 2, multiple PN sequences are used to identify some of the base stations in the system. Relative PN offsets can be used to distinguish between the base stations which are purely synchronized with one another. For example, in FIG. 2, the base stations 40A–40C are each assigned a unique one of three different PN offsets of a common PN sequence. The base stations 42–46 and the base stations 48 and 50 are each assigned a unique PN sequence. Given the use of multiple PN sequences, the use of a neighbor list to limit the search space becomes even more critical because it can be impractical to search over a plurality of PN sequences at all possible offsets in a timely fashion. In addition, because the entire period of the PN sequence must be searched, it is advantageous to limit the length of the PN sequence in order to limit the size of the search window. However, if the duration of each PN chip remains fixed and the length of the PN sequence is limited, the PN sequence repeats more frequently. For example, it can be advantageous to limit the period of PN sequences used in the system to approximately 10 ms or shorter although longer periods can be used.

As noted above with reference to FIG. 2, in a system where synchronous base stations and asynchronous base stations co-exist, several classes of synchronization can be used. For example, if GPS timing or some other reliable timing source is available, near-perfect synchronization can be achieved. Although it is less accurate in general, timing can also be transferred over the backhaul which connects the base station and the network controller. Other timing references include but are not limited to television and radio signaling and round trip delay reports from remote units. In some cases, a base station that was at one time coupled to a timing reference (such as GPS timing) loses connection to the timing reference and begins to run based upon its own internal timing source. In such a case, the degree of synchronization with the other base stations deteriorates gradually over time and eventually becomes asynchronous. For these reasons and others, base stations within a system can be classified as having one of several classes of synchronization.

In FIG. 2, the base stations 40A–40C can be classified as purely synchronous with respect to one another. Purely synchronous refers to base station timing which is known with a reasonably small uncertainty such as, for example, less than the duration of about 3 PN chips. If the relative timing of the base stations 42, 44 and 46 can be only determined within a larger window, they can be classified as frame synchronous. So, for example, if the relative timing of the base stations 42–46 can be determined within plus or minus one half of the duration of the PN sequence (i.e. one half the duration of the length of one frame) with respect to one another, they are considered frame synchronous.

The base stations 48 and 50 can be classified as asynchronous meaning that the relative timing of these base stations is unknown with respect to any other. In addition, we shall assume that the timing relationship of the base stations 42–46 with respect to the base station 40A–40C is also unknown.

Table I summaries the relative synchronization state between each base station shown in FIG. 2.

TABLE I

|     | 40A | 40B | 40C | 42 | 44 | 46 | 48 | 50 |
| --- | --- | --- | --- | --- | --- | --- | --- | --- |
| 40A |     | S   | S   | A  | A  | A  | A  | A  |
| 40B | S   |     | S   | A  | A  | A  | A  | A  |
| 40C | S   | S   |     | A  | A  | A  | A  | A  |
| 42  | A   | A   | A   |    | F  | F  | A  | A  |
| 44  | A   | A   | A   | F  |    | F  | A  | A  |
| 46  | A   | A   | A   | F  | F  |    | A  | A  |
| 48  | A   | A   | A   | A  | A  | A  |    | A  |
| 50  | A   | A   | A   | A  | A  | A  | A  |    |

Key
S  Synchronous within 3 PN chips
F  Synchronous within plus or minus one half frame
A  Asynchronous or unknown synchronization Note that although Table I and the text above refer to three different synchronization classes, many intermediate synchronization classes between purely synchronous and asynchronous can be specified. For example if a base station X is synchronized to a base station Y within time duration T1 and the base station X is synchronized to a base station Z within a time duration T2, the base station Y and the base station Z are synchronization within a time duration T1+T2, thus, defining several classes of synchronization.

If a remote unit has established an active communication link with the base station 40B, it is likely that the base stations 40A and 40C as well as the base station 48 are members of the neighbor list. Note that even though the base stations 40A–40C are purely sychronous with respect to one another, the relative synchronization of the base station 40B with the base station 48 is unknown. Thus, the base station 40B is asynchronous with respect to base station 48.

One way in which the search space can be limited is with reference to the relative synchronization class of the neighboring base stations. For example, if a remote unit has established communications with the base station 40A, it is very likely that the base stations 40B and 40C are members of the neighbor set. Knowing that the base stations 40A–40C are purely synchronous with respect to one another, the search space can be limited to a relatively small search window surrounding the relative nominal PN sequence offset in a similar manner as the prior art.

If a remote unit establishes an active communications link with the base station 44, the base stations 42 and 46 are likely to be in the neighbor set. Because each of these base stations uses a different PN sequence, in one example, the search window extends over each possible offset of the entire PN sequence. However, because these base stations are frame synchronous, the process of handoff as described in detail below is simplified to some extent.

If a remote unit has established an active communications link with the base station 48, the base stations 40A–40C are likely to be on the neighbor list. Because the base station 48 operates asynchronously with respect to the base stations 40A–40C, the search window must extend over each possible offset of the entire common PN sequence used by the base stations 40A–40C. In addition, if a remote unit has established an active communications link with the base station 48, it is likely that the base stations 42–46 are listed in the neighbor set. Once again, because the base station 48 operates asynchronously with respect to the base stations 42–46, all three PN sequences used in these base stations must be searched over each possible offset of the entire PN sequences. As discussed in further detail below, because the base station 48 is not even frame synchronous with the other base stations, additional handoff procedures are incorporated into the handoff process.

In order to communicate search space information to the remote unit, the neighbor list messages generated by the network controller 60 in an asynchronous system include additional information over and above that which was included in the IS-95 neighbor list message. One way in which such information can be incorporated into the neighbor list message is to implicitly convey the relative synchronization information in a search window parameter associated with each PN sequence designated in the neighbor list. For example, rather than explicitly specifying the relative class of synchronization, the search window designation can designate a limited PN search window, the entire PN period or infinity. If the active base station and a member of the neighbor set are purely synchronous, a search window can be specified which designates portion of the entire PN period in much the same manner as an IS-95 system. If the active base station and a member of the neighbor set are frame synchronous with respect to one another, the neighbor list message can designate that the search window comprises the entire PN period. If the base station with which active communication is established is asynchronous with respect to a base station which is a member of the neighbor set, the search window can be set to infinity. In this way, the remote unit can distinguish between a base station with which it is purely synchronous, a base station with which it has frame synchronization and a base station with which it is asynchronous. In systems with intermediate synchronization classifications between purely synchronous and frame synchronous, a variety of search window sizes can be used depending on the relative class of synchronization. In other embodiments, the relative synchronization class of the neighboring base stations can be explicitly designated in the neighbor list message.

As noted above, the neighbor list is used to facilitate soft handoff between the base stations. After a remote unit has established soft handoff with two or more base stations, the neighbor list associated with each of the active base stations is combined into one list by the network controller or by the remote unit as explained more fully below. In an IS-95 synchronous system, a combined neighbor list can be generated by simply taking the union of the neighbor lists associated with each active base station. Thus, an overall composite neighbor list is created from the individual neighbor list associated with each active base stations. According to IS-95, the composite neighbor list simply specifies the relative PN sequence offset of each member of each neighbor list associated with each active base station.

In an asynchronous system, there is no single timing reference and the generation of an efficient composite neighbor list cannot be accomplished by taking a simple union of the entries. For example, as noted above, if a remote unit has an active communication link established with the base station 48, the relative classification of the base stations 40A–40C is asynchronous. However, should the remote unit enter soft handoff between the base station 48 and 40B, a relative synchronization between the base station 48 and the base station 40A and 40C can be determined because the base stations 40A–40C are purely synchronous. Thus, when the remote unit enters soft handoff with the base station 40B, it is no longer necessary to search the entire period of the PN sequence used by the base stations 40A–40C because the nominal relative PN sequence offset is known. Thus, it is advantageous to take advantage of this information in order to further limit the search space.

One way in which the search space can be limited is to transmit to the remote unit a distinct neighbor list including synchronization information for each active base station. Thus, the remote unit may receive several entries corresponding to a particular base station. The remote unit uses the intersection of the set of search windows specified for a particular base station as the search space for that base station.

Another way in which the search space can be limited is to allow the network controller to combine the neighbor lists associated with each active base station in order to determine a custom composite neighbor list for the remote unit in soft handoff. For example, the network controller is aware of the active base stations and can designate one of the active base stations as the timing reference. The network controller can then determine the smallest possible search window using the synchronization information available to the remote unit. The network controller then combines the individual neighbor lists using the relative classes of synchronization. The remote unit uses the timing of the designated base station as the reference for determining the search space.

In yet another embodiment, these two approaches are combined. The network controller creates a customized neighbor list and transmits it to the remote unit. The remote unit further customizes the network controller generated list based upon the timing information it has. For example, the remote unit can further modify the neighbor list based upon a known relative timing between two base stations on the neighbor list. All three of these embodiments are more clearly understood with reference to the following example.

According to IS-95B, the neighbor list specifies the PN sequence offset used by the neighboring base station. In an asynchronous system, the neighbor list must also specify the PN code used by the base station. According to IS-95B, the PN sequence offsets are designated with a resolution of 64 PN chips. In an asynchronous system, a finer or more coarse resolution can be used.

According to IS-95B, in addition to specifying the PN sequence offset used by the neighboring base station, the neighbor list can also specify a search window size. The size of the search window can vary based upon the expected physical size of the active and neighboring base station coverage areas. Note that even in a fully synchronous system, some uncertainty in the relative PN sequence offset of synchronous base stations is expected due to the unknown propagation delays between the base stations and the remote unit.

In an asynchronous system, the neighbor list can be modified to include additional information. For example, as noted above, the range of search windows can be specified to include infinity or the entire PN period. In addition, the neighbor list specifies a reference to which the search window is specified. For example, if the remote unit has a base station in the active set which is synchronized to some extent with the neighboring base station, the neighbor list can specify a PN sequence offset with reference to the timing of the signal received by the active base station.

Thus, in an asynchronous system, the neighbor list entries contain (among other entries) the information listed in Table II below.

TABLE II

| Designation | Description |
| --- | --- |
| B.S. ID # | A base station identifier that is uniquely associated with the base station for this geographic area. |
| Reference B.S. | A reference base station (selected from the active set), the timing of which is used as the reference timing for the PN offset entry. |
| PN Offset | The center (or other known orientation) of the search window, relative to the time of the reference base station |

TABLE II-continued

| Designation | Description |
| --- | --- |
| Window Size | The size of the window of PN offsets to be searched |
| PN Code | The PN code transmitted by the identified base station |

So, for example, assume that the remote unit 52 of FIG. 2 has an active communication link established with the base station 40B. The neighbor list might include, among other information, the information given in Table III.

TABLE III

| B.S. ID # | Reference B.S. | PN Offset | Window Size | PN Code |
| --- | --- | --- | --- | --- |
| 40A | 40B | 459 | 128 | 3 |
| 40C | 40B | 873 | 128 | 3 |
| 44 | 40B | 0 | Infinity | 9 |
| 46 | 40B | 0 | Infinity | 11 |
| 48 | 40B | 0 | Infinity | 2 |

The information in Table III informs the remote unit 52 that it is likely to find the pilot signal from the base station 40A by performing a search using PN code #3 and searching the 128 PN sequence offsets surrounding PN offset 459 or, stated another way, searching PN offsets of 395 through 523 relative to the signal from the base station 40B. Similarly, the remote unit 52 that it is likely to find the pilot signal from the base station 40C by performing a search using PN code #3 and searching the 128 PN sequence offsets surrounding PN offset 873 or, stated another way, searching the PN sequence offsets of 809 through 937 relative to the signal from the base station 40B. In addition, the remote unit 52 is likely to find the pilot signal from the base stations 44, 46 and 48 by performing a searching using PN codes #9, #11 and #2, respectively, and searching over all PN sequence offsets.

Note that in practice, instead of specifying a window size and PN sequence offset with a resolution of one PN chip, a more coarse resolution can be used. More coarse designations can be used to reduce the number of bits needed to specify the neighbor list entry. For example, rather than allowing the window size to be specified to be any number between 1 and 32,768 or infinity which requires specification of 32,769 possible values and requires 16 bits of information, the set of possible window sizes can be limited. For example, the window size could be one of 32, 54, 126, 256, 512, 1024, 32768 PN chips or infinity which can be specified in only 3 bits.

In order to illustrate how neighbor lists from multiple active base station can be combined, assume that neighbor list for the base station 44 is specified in Table IV below.

TABLE IV

| B.S. ID # | Reference B.S. | PN Offset | Window Size | PN Code |
| --- | --- | --- | --- | --- |
| 48 | 44 | 0 | Infinity | 2 |
| 46 | 44 | 4096 | 2048 | 11 |
| 42 | 44 | 5120 | 256 | 9 |
| 40B | 44 | 0 | Infinity | 3 |

In this case, the base stations 48 and 40B are asynchronous with respect to the base station 44. The base station 44 has a level of synchronization with the base station 46 such that the receive timing uncertainty due to propagation delay unceranity plus uncertainty due to imperfect synchronization is 2048 chips. The base station 42 has a level of synchronization with the base station 44 such that the receive timing uncertainty due to propagation delay uncertainty plus uncertainty due to imperfect synchronization is 256 chips. In general, a small window size suggests a higher degree of synchronization, but the synchronization information is not expressly conveyed in the neighbor list message explicitly.

Now consider the case where the remote unit is in soft handoff between the base station 40B and 44. In one embodiment, as shown in the flow chart of FIG. 4, the network controller creates a combined neighbor list which is transferred to the remote unit via base stations 40B and 44 in block 120. For example, Table V shows the combined neighbor list.

TABLE V

| B.S. ID # | Reference B.S. | PN Offset | Window Size | PN Code |
| --- | --- | --- | --- | --- |
| 40A | 40B | 459 | 128 | 3 |
| 40C | 40B | 873 | 128 | 3 |
| 44 | 40B | 0 | Infinity | 9 |
| 46 | 40B | 0 | Infinity | 11 |
| 48 | 40B | 0 | Infinity | 2 |
| 48 | 44 | 0 | Infinity | 2 |
| 46 | 44 | 4096 | 2048 | 11 |
| 42 | 44 | 5120 | 256 | 9 |
| 40B | 44 | 0 | Infinity | 3 |

In block 122, the remote unit removes entries corresponding to the active base station 40B and 44 as shown in Table VI. In another embodiment, the entries corresponding to the active base stations remain on the neighbor list but are simply excluded from the searching process.

TABLE VI

| B.S. ID # | Reference B.S. | PN Offset | Window Size | PN Code |
| --- | --- | --- | --- | --- |
| 40A | 40B | 459 | 128 | 3 |
| 40C | 40B | 873 | 128 | 3 |
| 46 | 40B | 0 | Infinity | 11 |
| 48 | 40B | 0 | Infinity | 2 |
| 48 | 44 | 0 | Infinity | 2 |
| 46 | 44 | 4096 | 2048 | 11 |
| 42 | 44 | 5120 | 256 | 9 |

In block 124, the remote unit aligns the timing reference to one of the active base station such as the base station 40B. Note that the relative timing of signals received from two active base stations as received at the remote unit is readily determined by the remote unit. For example, in this case we assume that the signal received from the base station 40B is measured to be offset by 2200 PN chips from the signal received from the base station 44 and thus add 2200 chips to the PN sequence offsets specified with respect to the base station 44. The resulting entries are shown in Table VII.

TABLE VII

| B.S. ID # | Reference B.S. | PN Offset | Window Size | PN Code |
| --- | --- | --- | --- | --- |
| 40A | 40B | 459 | 128 | 3 |
| 40C | 40B | 873 | 128 | 3 |
| 46 | 40B | 0 | Infinity | 11 |
| 48 | 40B | 0 | Infinity | 2 |
| 48 | 40B | 2200 (or 0) | Infinity | 2 |
| 46 | 40B | 6296 | 2048 | 11 |
| 42 | 40B | 7320 | 256 | 9 |

In block 126, any overlap in the values specified in the table are removed. The results are shown in Table VIII. The overlap in values can be determined by taking the intersection of the search windows corresponding to a common base station entry.

TABLE VIII

| B.S. ID # | Reference B.S. | PN Offset | Window Size | PN Code |
|---|---|---|---|---|
| 40A | 40B | 459 | 128 | 3 |
| 40C | 40B | 873 | 128 | 3 |
| 48 | 40B | 0 | Infinity | 2 |
| 46 | 40B | 6296 | 2048 | 11 |
| 42 | 40B | 7320 | 256 | 9 |

In the example of Table VIII, the resultant window overlap areas for the base stations 46 and 48 are equal to smallest window size before combination. This is not always the case. For instance, in an example not shown in Table VIII, for two entries corresponding to a common neighbor base station with reference to a common active base station, if the first entry specifies a 128 PN chip search window centered about 3093 (or, equivalently, a search window from 3029 to 3157) and a second entry specifies a 2048 PN chip search window centered about 4096 (or, equivalently, a search window from 3072 to 5120), we get a common range of 3072 to 3157. In the case where an entry appears on the neighbor list more than twice, a common, continuous search window can be determined by taking the intersection of all the search window entries corresponding to the common base station. In one embodiment, the intersection of the search windows is increased or decreased by some small amount. In another embodiment, the intersection is rounded up or down to conform to a set of standard search window ranges.

Although blocks 124 and 126 are shown above as distinct operations for clarity purposes, in an actual embodiment, the activities of blocks 124 and 126 can be carried out in a single step without explicitly creating the information given in Table VI. In addition, when creating the composite neighbor list, the remote unit or network controller need not create an explicit list in any particular form so long as the available information is used to effectively limit the search space.

Figure 3:
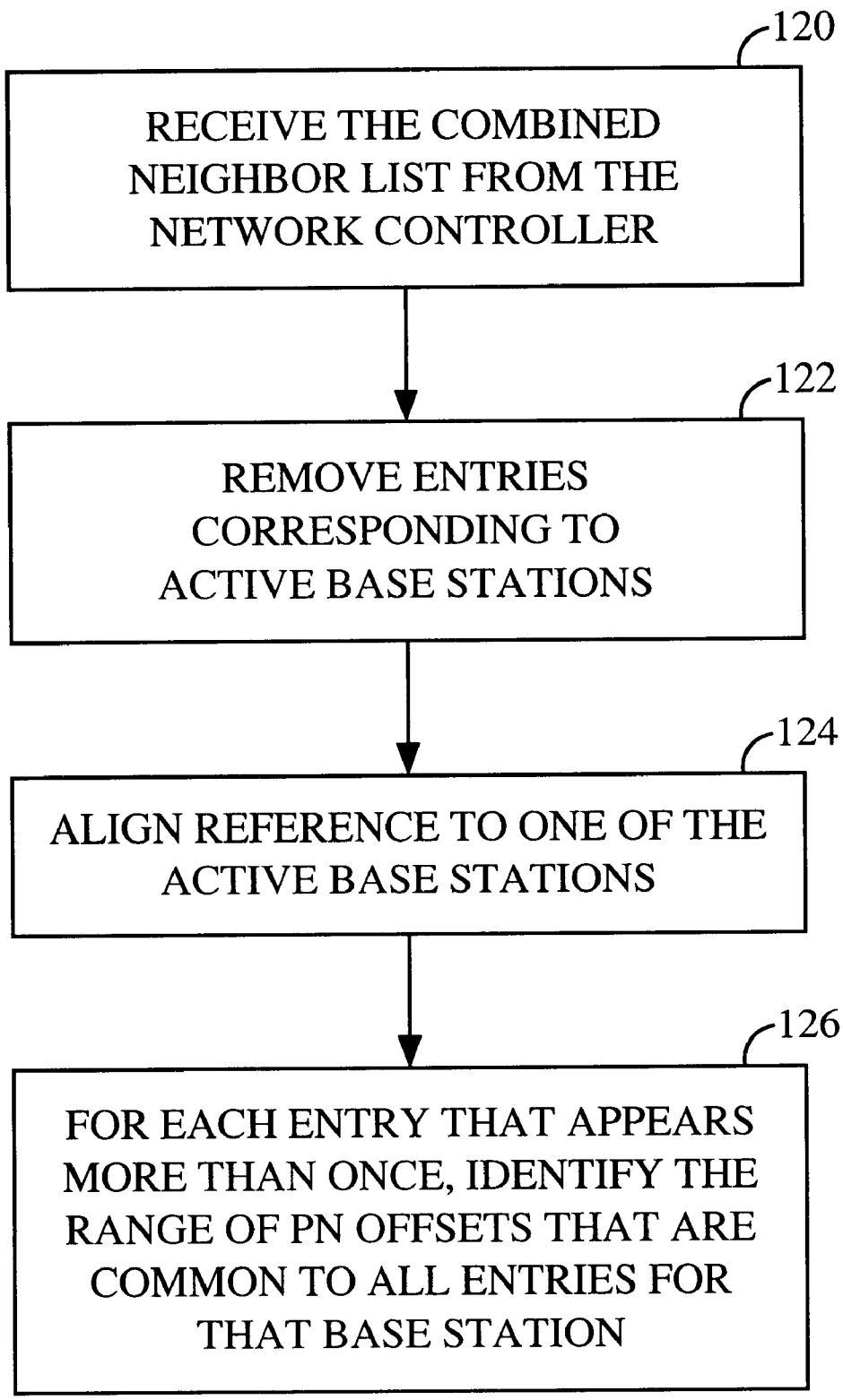
FIG. 3 is a flow chart illustrating neighbor list combination.

In the scenario just described with reference to FIG. 3, the neighbor lists are combined in part in the remote unit. This same type of combination can occur in the network controller, provided that the relative timing offsets between the signal from the active base station is reported from the remote unit to the network controller. Even if the relative timing offsets are not reported to the network controller, some level of combining can be done. For example, if one entry specifies an infinite search window for a particular base station and another entry specifies a smaller window, the smaller window can always be used. Neighbor list combinations in the network controller results in a reduction of information transferred over the air which is advantageous to system capacity. However, combining lists at the network controller can also increase backhaul signaling which is required.

Each frame of data which is transferred over the forward link to the remote unit is comprised of a series of symbols. When a remote unit is in soft handoff between two base stations, it combines the signals received from each base station on a symbol by symbol basis. The combination of signals from multiple base stations is described in detail in the referenced issued patents. If the information from each base station is received at the remote unit at a different time, the earlier arriving information must be buffered until the latest arriving information is received. It is advantageous to limit the amount of buffered data, both for ease of implementation and to limit the cumulative delay.

If two base stations are asynchronous with respect to one another, when the remote unit detects the pilot signal of a neighboring base station, it can detect the relative time offset between the two base stations only within the duration of the PN sequence. The remote unit cannot discern the absolute timing difference between the base stations. Stated another way, if the relative timing offset between two asynchronous base stations is greater than the period of the PN sequence, the remote unit detects only the modulo portion of the timing offset between the two base stations. For example, if the PN sequence repeats every 10 ms and the time offset between the neighboring base station and the active base station is 14 ms, the remote unit detects only a 4 ms offset between the two base stations. If the remote unit enters soft handoff between these two base stations and the information transmitted from the newly active base station is offset from the information transmitted by the originally active base station by only 4 ms, on average, the remote unit buffers 10 ms worth of data from the time advanced base station before the corresponding information is received from the base station with the greatest delay. The same type of result occurs if the timing between two base stations is offset by 104 ms except that 100 ms of data must be buffered at the remote unit. Such relatively large timing errors are to be expected when two base station are asynchronous with respect to one another. As noted above, such delays are undesirable in the system and increase the buffering requirements of the remote unit. According to the operation described below, such buffering is avoided by aligning the transmissions from the base stations so that the signals arrive at approximately the same time. In addition, ambiguity in the frame timing must be resolved before the remote unit can determine which symbols to combine with one another.

Once frame alignment is established, the timing of the forward link signals transmitted from the active base stations is more finely adjusted so that the signals arrive at the remote unit aligned to the symbol level. Due to the multipath and variable path delays, the forward link signals seldom arrive at the remote unit at exactly the same time. However, using time alignment techniques as described in IS-95, timing on the order of a few symbols can be achieved in most systems.

Figure 4:
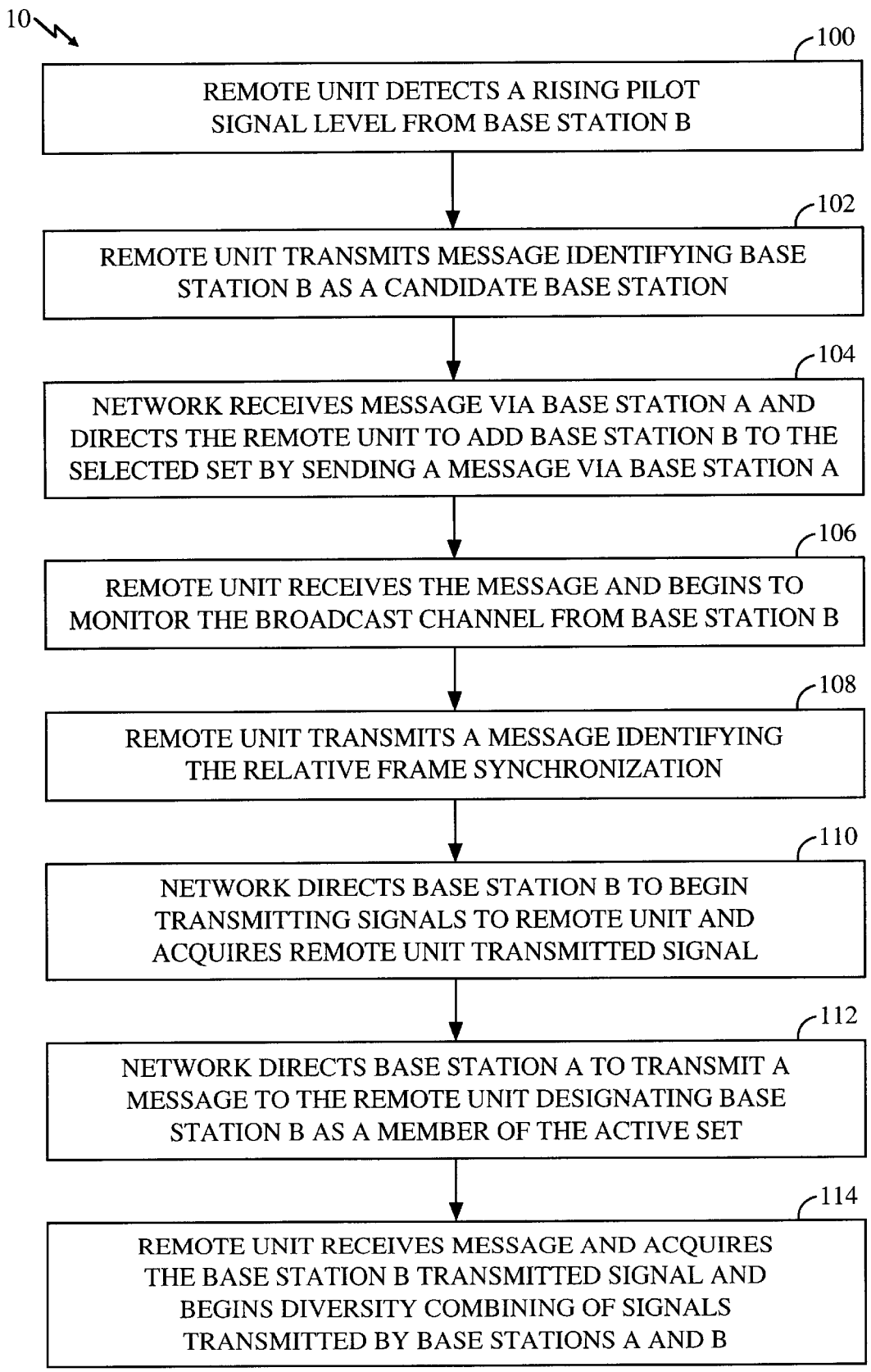
FIG. 4 is a flow chart illustrating the use of a selected set in a system comprising asynchronous base stations.

The frame synchronization of asynchronous base stations can be determined before the remote unit enters soft handoff between two asynchronous base stations. The frame synchronization of a base station can be determined by the remote unit based upon an overhead channel such as a broadcast channel transmitted from a base station. FIG. 4 is a flow chart showing the process of entering soft handoff between two asynchronous base stations. In FIG. 4, we shall assume that the remote unit has established communications with a base station A and that the base station A and a base station B are asynchronous with respect to one another.

In block 100, the remote unit detects a rising pilot signal level from the base station B. Such detection can result from searching over a search space designated in a neighbor list as specified above. The remote unit transmits a message identifying the base station B as a candidate base station in block 102. In block 104, the network controller receives the message via the base station A. The network controller determines whether resources are available in the base station B to service the remote unit. If such resources are available, the network controller directs the remote unit to add the base station B to a selected set by sending a message via the base station A. The selected set comprises entries corresponding to base stations which have been promoted from the candidate set but about which frame synchronization information is not available.

In block 106, the remote unit receives the message and adds an entry corresponding to the base station B to the selected set. The remote unit then monitors an overhead channel from the base station B in order to determine the current frame alignment if such alignment is unknown. The overhead channel is typically a broadcast channel which carries base station and system information to remote units within the coverage area of the base station.

In block 108, the remote unit transmits a message identifying the relative frame synchronization of the base station B. In block 110, the network controller receives the message and directs the base station B to begin transmitting signals to the remote unit according to the frame synchronization information such that signals from the base station A and signals from the base station B arrive at the remote unit frame synchronized. The network controller also directs the base station B to search for the remote unit transmitted signal. In block 112, the network controller directs the base station A to transmit a message to the remote unit designating the base station B as a member of the active set. In block 114, the remote unit receives the message, acquires the base station B transmitted signal and begins diversity combining the signals transmitted by base stations A and B.

Notice that a new set of base stations has been created in block 104: the selected set. The selected set designates base stations which will be added to the active set upon the receipt of the relative frame synchronization information. In order to monitor the broadcast channel, precious remote unit resources must be expended on the task. Therefore, in order to efficiently use the remote unit resources, it is advantageous to avoid monitoring the broadcast channel unless the network controller has determined that the candidate base station has the available resources to become an active base station. For this reason, in one embodiment, it is advantageous if frame synchronization information is not collected for every member of the neighbor set.

In another embodiment, the frame synchronization information is collected corresponding to entries on the neighbor list without the use of a selected set. For example, the remote unit can determine the frame synchronization information just before or shortly after a base station becomes a member of the candidate set. Alternatively, the remote unit can determine frame synchronization information of entries in the neighbor list having a signal strength that exceeds some threshold which is less than the threshold used to determine eligibility for the candidate set.

The selected set operation shown in FIG. 4 need not be executed for base stations which are purely synchronous or frame synchronous with respect to one or more of the active base stations. The process shown in FIG. 4 may be implemented for a third, fourth or greater number of base stations if the subsequent base stations are asynchronous with respect to any of the active base stations. If an additional purely synchronous or frame synchronous base station is detected by the remote unit, it can directly become a member of the active set from the candidate set without the intermediate step of becoming a member of the selected set.

In some systems, a frame-worth of symbols is transferred from the network controller to each active base station at the same time. Thus, a base station can determine when to transmit the frames with an accuracy approximately equal to the variation in relative propagation delay associated with the backhaul which connects the base stations to the network controller. If such relative delays are less than the frame duration, the base station can derive coarse timing based upon the arrival time of the frames from the network controller and more precise timing based upon feedback received from the remote unit.

Even if the relative delays are larger than the duration of a frame, the remote unit can attempt to combine symbols from multiple base stations at a variety of frame offsets until it finds the frame offset which generates the lowest error rate. Once the relative synchronization is determined, in one embodiment, the remote unit can report to the base stations and the base stations can align future transmissions. This type of operation does not alleviate the need for additional buffering in the remote unit but it eliminates the need for the remote unit to monitor an additional base station signal to determine the frame number as described below. In addition, once frame synchronization is established, this method eliminates excessive delay.

Figure 5:
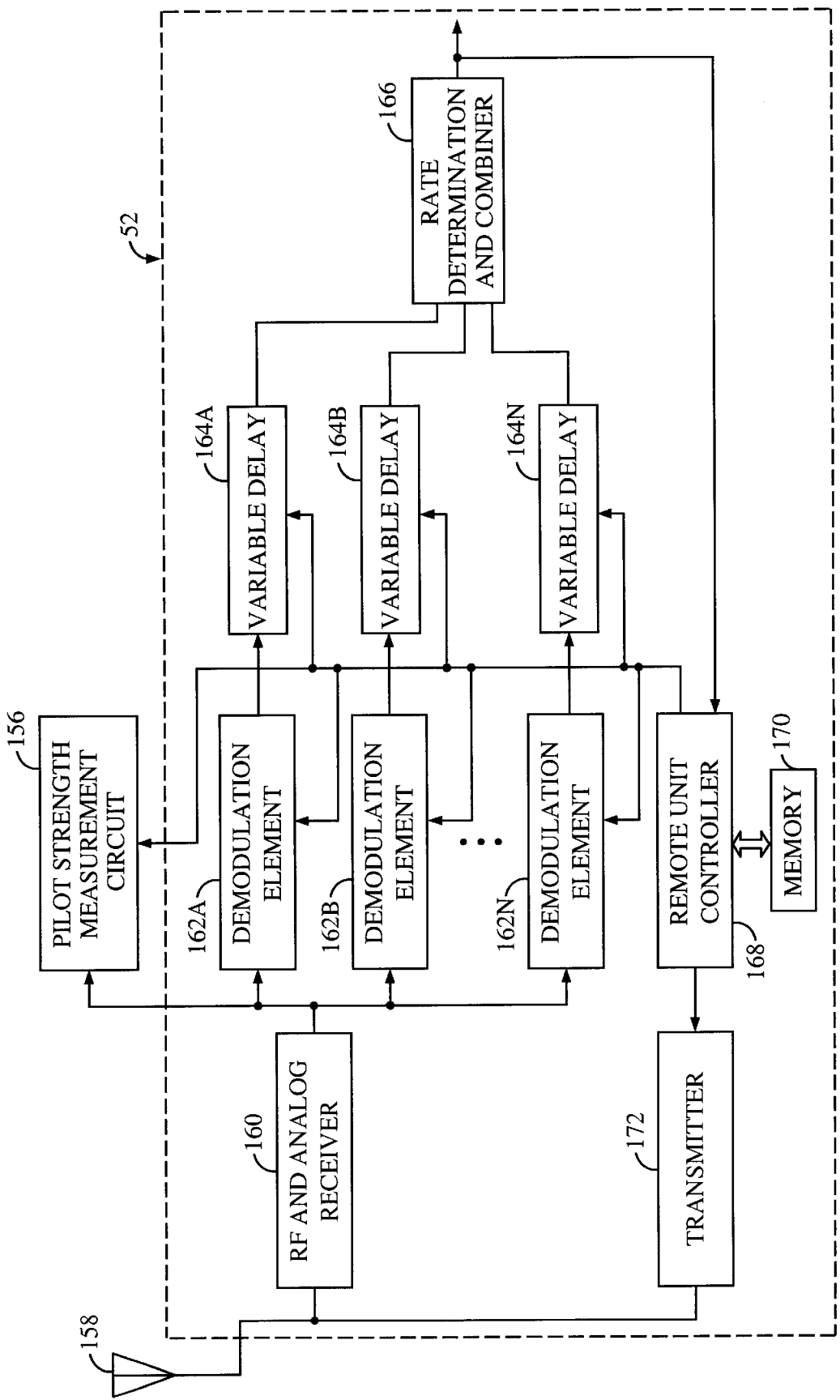
FIG. 5 is a block diagram of a remote unit.

A block diagram of the remote unit 52 suitable for use in conjunction with the just mentioned operation as well as with operation according to other embodiments disclosed herein is shown in FIG. 5. Referring to that figure it is seen that the remote unit 52 receives forward link signal via an antenna 158. A radio frequency (RF) and analog receiver 160 receives the forward link signal and converts the signal to digital samples according to well known techniques. The digital samples are distributed to a series of demodulation elements 162A–162N. Information concerning the structure and operation of the demodulation elements 162A–162N and demodulators in general can be found in U.S. Pat. No. 5,764,687, entitled "MOBILE DEMODULATOR ARCHITECTURE FOR A SPREAD SPECTRUM MULTIPLE ACCESS SYSTEM" and U.S. Pat. No. 5,109,390, entitled "DIVERSITY RECEIVER IN A CDMA CELLULAR TELEPHONE SYSTEM", assigned to the assignee hereof and incorporated herein by reference. Each demodulation element 162A–162N can be assigned to a forward link signal instance from any one of the active base stations. The outputs of the demodulation elements 162A–162N are coupled, respectively, to variable delay unit 164A–164N. The variable delay units 164A–164N function to time align the output of each of the demodulation elements 162A–162N so that they can be combined. The variable delay units 164A–164N can be embodied as a data storage unit. The amount of delay inserted in each path is determined by a remote unit controller 168.

The outputs of the variable delay units 164A–164N are coupled to a rate determination and combiner block 166. The rate determination and combiner block 166 can operate according to well known combination techniques such as those disclosed in U.S. Pat. No. 5,566,206, entitled "METHOD AND APPARATUS FOR DETERMINING DATA RATE OF TRANSMITTED VARIABLE DATA IN A COMMUNICATIONS RECEIVER" which is assigned to the assignee hereof and incorporated herein by reference. The output of the rate determination and combiner 166 is coupled to the remote unit controller 168 as well as to further signal processing units (not shown) such as a vocoder or modem. In one embodiment, the variable delay units 164A–164N are embodied as a circular buffer that is accessed by the demodulation element 162A–162N as described in the above referenced patents.

The controller 168 is also coupled to the output of the rate determination and combiner block 166. If the information carried on the forward link transmission carries messages from the network controller, the remote unit controller 168 extracts those messages from the output of the rate determination and combiner 166 and responds to them. For example, the controller 168 extracts the information from the forward link transmission concerning the active, selected and neighbor sets. In the embodiment given above, if the forward link transmission comprises a message designating a selected set, the controller 168 commands at least some of the demodulation elements 162A–162N to demodulate an overhead channel from the designated base station. The controller 168 extracts the frame synchronization information from the output of the rate determination and combiner 166 and determines frame synchronization of the designated base station. In one embodiment, the remote unit simply forwards a frame serial number received from the target base station to the network controller and the network controller determines the actual frame synchronization according to well known techniques.

The controller 168 is also coupled to a memory unit 170 which can be used to store information. In addition, the controller 168 is coupled to a transmitter 172 which receives digital data for transmission from further signal processing units (not shown) such as a vocoder or modem. The transmitter 172 creates signals for transmission over the reverse link. The controller 168 can also create messages for transmission to the network controller via the transmitter 172. For example, the remote unit controller 168 can create a message informing the network controller of the relative delay between signals received from two active base stations or concerning the frame synchronization information of a base station in the selected set.

The output of the RF and analog receiver 160 is also coupled to a pilot strength measurement circuit 156. In one embodiment, the pilot strength measurement circuit 156 is comprised of a set of searching elements or a searcher front end as described in the above referenced patents such as U.S. Pat. No. 5,764,687. The output of the pilot strength measurement circuit 156 is coupled to the remote unit controller 168. In addition, the remote unit controller 168 controls the operation of the pilot strength measurement circuit 156. For example the remote unit controller 168 selects the PN sequence, PN sequence offset and window size over which the pilot strength measurement circuit 156 searches for the pilot signals from the base stations. As discussed above, in one embodiment, the controller 168 allocates the searching resources within the pilot strength measurement circuit 156 in accordance with the information in the neighbor list.

Figure 6:
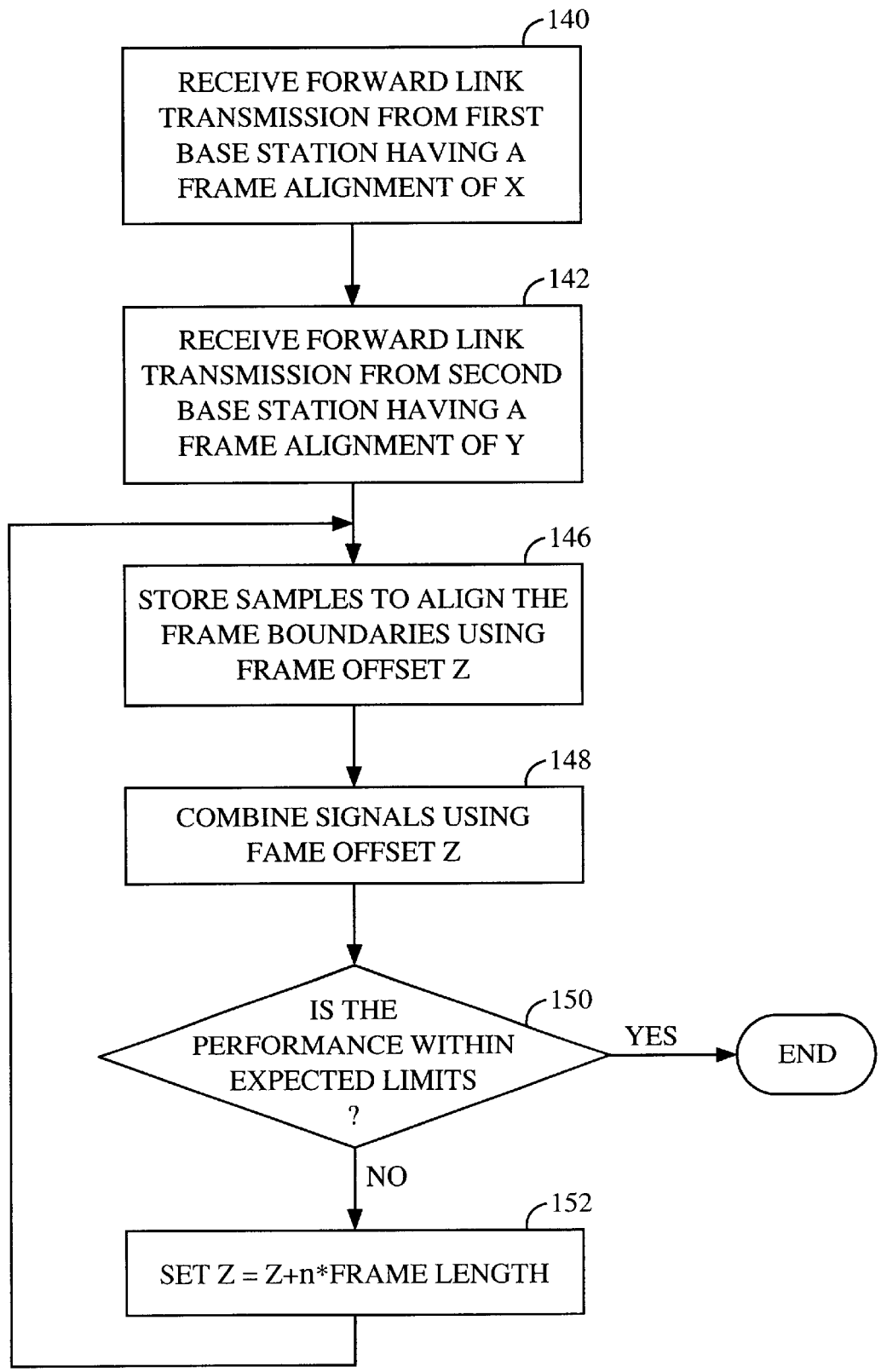
FIG. 6 is a flow chart illustrating remote unit assisted frame alignment.

FIG. 6 is a flow chart detailing the alternative frame alignment process referred to above where no selected set is created. According to FIG. 6, an entry corresponding to a candidate base station is moved directly to the active set even if the frame alignment of the base station with respect to the other active base stations is unknown. The frame alignment process illustrated in FIG. 6 is remote unit assisted in that the remote unit determines the frame alignment without reference to information received explicitly from the base station or network controller. Thus, the embodiment of FIG. 6 avoids the round trip delay associated transmission of information between the remote unit and the base station which is incurred with the use of the selected set.

In block 140, the remote unit receives and demodulates a forward link signal from a first base station having a time alignment of X. If the first base station is the only active base station, the time alignment of the first base station can be assumed to be the timing reference for the remote unit in which case X is conveniently set to 0.

In block 142, the remote unit receives and demodulates a forward link signal from a second base station having a time alignment of Y. If the second base station is the newly added active base station, Y is typically some positive or negative non-zero value which is the modulo result of comparing the PN sequence timing of the first base station to the PN sequence timing of the second base station. Thus, the time alignment Y specifies the timing of the frame boundaries but does not specify the absolute frame timing of the second base station. Thus, in a typical embodiment, if the value of X is 0, the absolute value of Y is less than the PN sequence period.

The demodulated data corresponding to one signal instance is stored (such as by one of the variable delay units 164) until the timing of the signals is aligned with respect to the frame boundaries using a frame offset Z in block 146. However, note that the absolute frame alignment is not yet known so the frame offset Z may align the signals on frame boundaries offset from one another by an integer number of frames. For example, in one embodiment, the value of Z is initially zero and the relative offset of the signals is assumed to be the difference between X and Y.

In block 148, the signals are combined such as by the rate determination and combiner block 166. Note that when the frame boundaries are offset from one another, the information carried by the symbols is generally different, thus degrading receiver performance by the addition of arbitrary energy. When the frame boundaries are aligned, the information carried by the symbols is the same, thus increasing the energy available to the receiver and increasing the performance of the receiver in comparison with demodulating only the signal from the first base station. According to well known techniques such as those taught in the above referenced U.S. Pat. No. 5,566,206, the rate determination and combiner block 166 determines an error rate or other performance indicator or indicators with respect to received signals. In block 150, if the performance indicator is within acceptable limits, it is assumed that the frame alignment is proper and the process terminates. For example, acceptable limits can be determined by comparison of error rates before and after combination is begun. If the performance indicator is not within acceptable limits, flow continues to block 152.

In one embodiment, several frame offset hypotheses are tested and the results are compared in a similar manner as described in the above reference U.S. Pat. No. 5,566,206. In one embodiment described in the patent which can be directly applied to the invention, two or more performance indications are compared from multiple rate hypothesis to determine the most likely transmitted data rate. According to the invention, data can be collected for a series of frame alignment hypothesis and the results can be compared to determine the most likely correct frame alignment.

In block 152, the delay inserted by the variable delay units 164 is offset from a previous value by some integer multiple of a PN sequence period. The process repeats using different frame offsets until an acceptable performance indication is produced. For example, in one embodiment the value of n is incremented in a linear fashion alternating between positive and negative values such as n=0, 1, −1, 2, −2, 3 etc. In addition, this process, beginning again with block 140, can be repeated for additional base stations as more or different base stations are added to the active set in order to align the timing of subsequent active base stations.

Although the principles are described above with reference to a system in which several classes of synchronization are used, the principles can be applied generally to systems in which all of the base stations have the same class of synchronization. In addition, although the individual PN sequences are referred to as "unique," the sequences can be re-used in base stations which are operating at a different frequency or which are separated by a sufficient path loss (general evidenced by a sufficient geographical distance) so that the base station signals could not be simultaneously detectable by any remote unit.

The techniques described above can also be applied to control of hard "break-before-make" handoff. Although base stations in an IS-95 continually transmit a pilot signal, the teachings of the invention are directly applicable to systems in which the pilot signal is transmitted intermittently. The embodiments shown above with reference to neighboring base station can be directly applied to those base station which are considered to be remaining set base stations. For example, in one embodiment, the remaining set base stations are included within the neighbor set but are allocated a smaller portion of the searching capabilities of the remote unit.

A remote unit operating according to the invention can include embodiments which are implemented in application specific integrated circuits (ASIC), with discrete logical components, in software which is executed on a microprocessor or in firmware. Likewise, a base station or network controller operating according to the invention can include embodiments which are implemented in application specific integrated circuits (ASIC), with discrete logical components, in software which is executed on a microprocessor or in firmware.

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. A method of determining a neighbor list for use in a cellular communication system, comprising the steps of:

receiving one or more neighbor lists corresponding to one or more active base stations;

removing entries from said one or more neighbor lists corresponding to base stations through which active communication is established;

aligning a time offset reference of at least one entry in said neighbor lists so that said entries in said neighbor lists are referenced to a common timing reference; and for each base station having more than one entry on said neighbor list, determining a single composite entry specifying a composite search window equal to the intersection of a search window specified in each entry corresponding to said base station.

2. The method of determining a neighbor list of claim 1, wherein each of said entries corresponds to a base station with a high probability of having signal strength sufficient to establish communication and wherein each of said entries comprises information identifying a reference base station and a PN offset wherein a timing of said reference base station is used as a reference timing for said PN offset.

3. The method of determining a neighbor list of claim 2, wherein said entries further comprise a window size over which a search should be performed.

4. The method of determining a neighbor list of claim 3, wherein said window size implicitly carries information concerning a relative class of synchronization between said reference base station and said base station to which said entries correspond.

5. The method of determining a neighbor list of claim 3, wherein said window size carries information concerning whether said base station corresponding to said entry is frame synchronized with said reference base station.

6. The method of determining a neighbor list of claim 1, wherein said step of aligning is executed by a network controller based upon a relative time alignment indication received from a remote unit for which said neighbor list is intended.

7. The method of determining a neighbor list of claim 1, wherein said step of aligning is executed by a remote unit based upon a relative time alignment between said base stations through which active communication is established as measured by said remote unit.

8. An apparatus for determining a neighbor list for use in a cellular communication system, comprising:

means for receiving one or more neighbor list corresponding to one or more active base stations;

means for removing entries from said one or more neighbor lists corresponding to base stations through which active communication is established;

means for aligning a time offset reference of at least one entry in said neighbor lists so that said entries in said neighbor lists are referenced to a common timing reference; and means for determining a single composite entry for each base station having more than one entry on said neighbor list, said entry specifying a composite search window equal to the intersection of a search window specified in each entry corresponding to said base station.

* * * * *